UNITED STATES PATENT OFFICE.

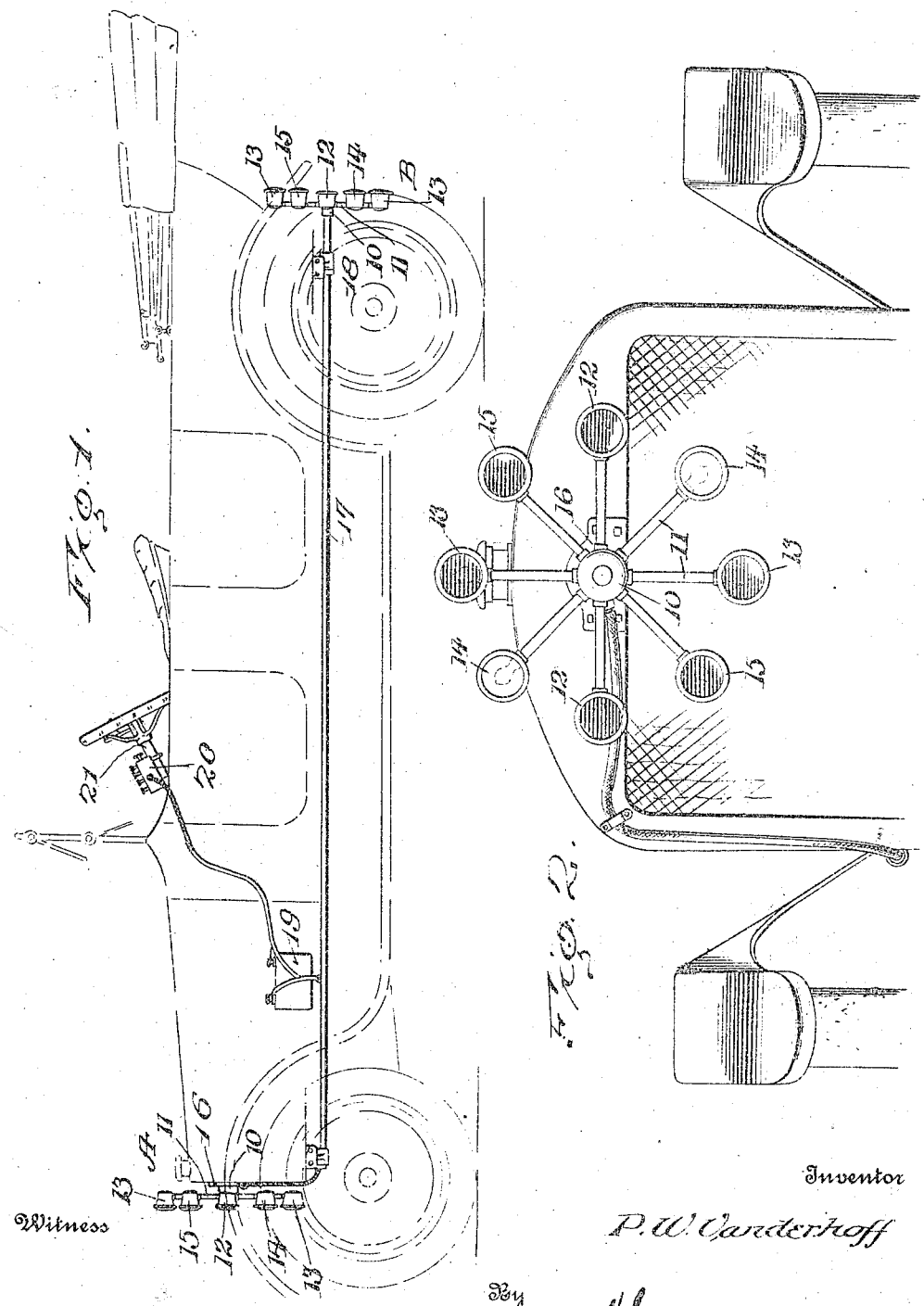

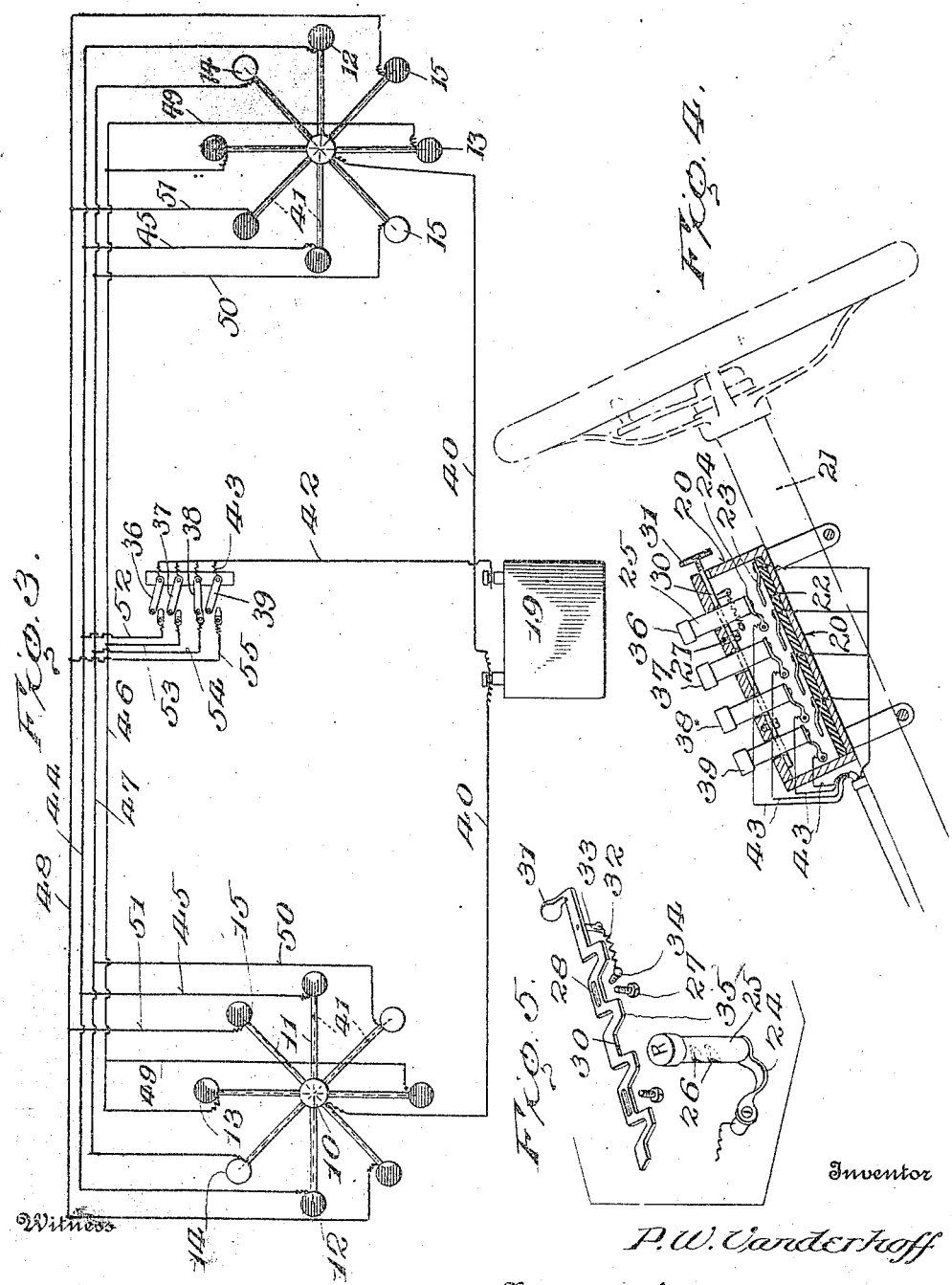

PAUL W. VANDERHOFF, OF TOPEKA, KANSAS.

SELECTIVE DIRECTION-INDICATOR FOR VEHICLES.

1,283,370.

Specification of Letters Patent. Patented Oct. 29, 1918.

Application filed February 27, 1917. Serial No. 151,318.

*To all whom it may concern:*

Be it known that I, PAUL W. VANDERHOFF, a citizen of the United States, residing at Topeka, in the county of Shawnee and State of Kansas, have invented certain new and useful Improvements in Selective Direction-Indicators for Vehicles, of which the following is a specification.

My invention relates to new and useful improvements in signaling devices for vehicles and more particularly for motor vehicles, the primary object of my invention being the provision of a system by means of which the driver of a vehicle may indicate his intention to proceed directly ahead, to turn to the left, to turn to the right, or to stop, by the selective energization of certain electric lights or equivalent signals.

In this connection a still further object which I have in view is the arrangement of a pair of duplicate signal mechanisms adapted to be mounted one at the front and one at the rear of the vehicle and each including a plurality of lights arranged in circular formation with respect to each other so that in all instances there are two lights directly opposed to each other, as, for instance, two one above the other or two in a horizontal line, two inclining upwardly toward the left and two inclining upwardly toward the right, and in providing circuits for selectively energizing any pair of lights so that the relative disposition of active lights may indicate the desired signal.

A further object which I have in view is the provision of suitable circuits and a simple switch structure by means of which any desired pair of lights at the front and the corresponding pair of lights at the rear may be simultaneously energized.

With these and other objects in view, my invention will be more fully described, illustrated in the accompanying drawings, and then specifically pointed out in the claims which are attached to and form a part of this application.

In the drawings:

Figure 1 is a side elevation of a conventional form of motor vehicle equipped with my signaling system;

Fig. 2 is a front elevation showing one of the signals upon a somewhat larger scale;

Fig. 3 is a diagrammatic view of my signaling system clearly showing the circuits and switch;

Fig. 4 is an elevation of steering column of the vehicle showing my improved switch box mounted thereon, the switch box being in section; and Fig. 5 is an unassembled perspective view of certain switch elements.

Corresponding and like parts are referred to in the following description and indicated in all the views of the accompanying drawings by the same reference characters.

My improved signaling mechanism includes a signaling device A and a signaling device B adapted to be mounted one at the front and one at the rear of the vehicle in any suitable manner. These signaling devices are identical in construction and corresponding parts have similar reference numerals.

Each signaling device includes a hub or supporting member 10 and a plurality of radially extending arms 11, each arm being disposed at an angle of 45° to adjacent arms. By this arrangement eight arms are provided each arm extending in a direction opposite to some other arm. Hereafter in speaking of the arms any arm and that arm extending opposite to it will be termed a pair of arms and signals carried by them will be termed a pair of signals. Each arm at its free end carries the signal in the form of a lamp casing inclosing an incandescent light bulb. The casings carried by one pair of arms are indicated at 12, those carried by another pair at 13, those carried by another pair at 14, and those carried by another pair at 15. The various signals given by my system consist in the selective lighting of the various pairs of lamps, the horizontally disposed pair of lamps indicating an intent upon the part of the driver to proceed straight ahead, the vertically disposed lamps indicating an intent to stop, the lamps 14 in which one is above and to the right of the other indicating an intent to turn to the right and the other pair of lamps in which one is above and to the left of the other an intent to turn to the left. Preferably the wires from the light bulbs are run through the arms or the hub in order to protect them from injury to exposure.

The forward signal A may be supported upon the radiator or other suitable portion of the vehicle by a bracket 16 and preferably the rear signal B is supported upon one end of a pipe 17 which extends longitudinally of the car, being supported by brackets 18 and forming a conduit for the wires leading from the lights. Of course this pipe may be done away with and the signal B may be supported by a bracket fixed to the vehicle and the wires may be formed into a cable without further protection. Any suitable source of electrical energy, such as a storage battery 19 may be provided and a number of switches, preferably mounted in a common switch box 20 supported upon the steering column 21 of the vehicle will control the passage of current to the various lights.

Any suitable form of switch may be provided but I prefer to have a switch in which a single movable element may close a selected circuit and in which the closing of a further circuit by another element will automatically open the first circuit. Such a switch structure is illustrated in Figs. 4 and 5 in which the switch box 20 has a false bottom 22 of insulating material which carries a plurality of spaced spring contacts 23 each of which is engageable by a coöperating spring contact 24 supported within the box. The spring contacts 23 and 24 in each instance are normally out of engagement with each other and each spring contact 24 is movable into engagement with its contact 23 by pressure exerted against it by the plunger 25 reciprocally mounted in the top wall of the casing. These plungers 25 are preferably fixed to the spring contacts 24 so that they will be held against disengagement from the casing and against turning movement, and each plunger in one face is provided with a pair of spaced tangentially extending notches 26.

A pair of screws 27 are passed through slots 28 formed in a slide 30 to hold the slide against the inner face of the cover of the top of the box and leave it free for limited reciprocation. One end of this slide projects through the end of the box and has a finger key 31 by which the slide may be moved. A helical spring 32 is connected at one end to a depending finger 33 carried by the slide and at its other end to a stud 34 projecting from the wall of the box to normally hold the slide in extended position. The slide at points normally opposite each plunger 25 is formed with projecting portions 35 the lateral edges of which are adapted to seat in one or the other of the notches 26 of the keys or plungers 25 according to whether such plungers are in extended or depressed position. This slide will therefore serve to frictionally lock the plungers in extended position and also to frictionally lock any depressed plunger in its depressed position. The notches in the plungers are beveled so that any plunger may be depressed without interference from the slide, the slide being merely moved against the action of its spring until the upper notch of such plunger comes into a line with it when the slide snaps back into place to lock such depressed plunger and to again lock the remaining projected plungers. Obviously the depression of any plunger therefore moves the slide in such a manner that it will release any plunger previously locked in depressed position. These plungers and their correlated contacts provide a plurality of switches 36, 37, 38 and 39 which are adapted to control the circuits to the lights 12, 13, 14 and 15 respectively. By means of these switches any desired light circuit or combinations of light circuits may be closed and all other circuits which were previously closed will be automatically opened. At the same time any circuit or circuits closed may be opened without the closing of any other circuit by manual extension of the slide through its release key 31.

Reference to Fig. 3 of the drawings will disclose a preferred form of wiring for my improved signaling system. As there shown wires 40 lead from one of the binding posts of the battery 19 to the hubs 10 of the signals and branch wires 41 lead from the ends of these wires through the arms of the signals to one contact of each light socket so that one contact of each light socket is always in electrical connection with one binding post of the battery. A wire 42 leads from the other binding post of the battery and branch wires 43 lead from it to the plunger-engaging contacts 24 of the switches. A wire 44 connects the free contact of the socket of one of the lights 12 of the front signal with the free contact of the corresponding light socket of the rear signal while wires 45 connect the free contacts of the sockets of the other lights 12 with the wire 44. In like manner wires 46, 47 and 48 connect the free contacts of the sockets of one of the lights 13, 14 and 15 of the front signal with one of the corresponding lights of the rear signal and wires 49, 50 and 51 connect the free contacts of the remaining lights 13, 14, and 15 with the wires 46, 47 and 48 respectively. A wire 52 connects the contact 23 of the switch 36 with the wire 44 and wires 53, 54 and 55 connect the corresponding contacts of the switches 37, 38 and 39 respectively, with the wires 46, 47 and 48.

Under these conditions it will be apparent that closing of the switch 36 will close a circuit through all of the signal lights 12 which, being in horizontal alinement with each other, will give a signal both at the front and rear of the vehicle of the driver's intent to proceed toward the right. In like manner closing of the switch 37 will energize all of the lights 13 to give a signal of the driver's intent to stop, while closing of the switches 38 or 39 will energize the lights 14 or 15 to indicate intent on the part of the driver to turn to the right or to the left, as the case may be.

In order that no mistake may be made the switch keys are preferably inscribed to indicate which circuit they control and in order that the signals may be effective both at day and night the lenses of the lamps are preferably of glass having some distinctive color such as red, green or blue. It is believed that the manner of installing and operating my improved signaling system will be readily understood from the foregoing description. I of course, however, reserve the right to make any changes within the scope of the appended claims without in the slightest degree departing from the spirit of my invention.

Having thus described my invention, what I claim as new is:

1. A direction signal for vehicles including a fixed hub, a plurality of arms extending radially from the hub, each arm being diametrically disposed with respect to another, a signal light casing mounted on the free end of each arm, the hub being hollow and the arms being tubular and opening at their inner terminals into the hub, electric light bulbs in each of the casings, and electric conductors leading from the bulbs through the arms into the hub and housed by the said arms and the hub.

2. A direction signal for vehicles including a closed hollow hub, a plurality of tubular arms extending radially from the hub and opening at their inner ends into the hub, a signal light casing mounted on the outer end of each arm, supporting means engaged with the hub for holding the hub fixed and opening into the hub, and electric conductors leading from the said casing through the arms, the hub and said supporting means to to be housed thereby.

In testimony whereof I affix my signature.

PAUL W. VANDERHOFF. [L. S.]